United States Patent [19]

Hildner

[11] Patent Number: 4,682,797
[45] Date of Patent: Jul. 28, 1987

[54] CONNECTING ARRANGEMENT WITH A THREADED SLEEVE

[75] Inventor: Knut Hildner, Schriesheim, Fed. Rep. of Germany

[73] Assignee: Friedrichsfeld GmbH Keramik-und Kunststoffwerke, Mannheim, Fed. Rep. of Germany

[21] Appl. No.: 878,247

[22] Filed: Jun. 25, 1986

[30] Foreign Application Priority Data

Jun. 29, 1985 [DE] Fed. Rep. of Germany ....... 3523388

[51] Int. Cl.[4] ............................................. F16L 47/00
[52] U.S. Cl. ...................................... 285/40; 285/21; 285/238; 285/347; 285/351; 285/355; 285/915
[58] Field of Search ............... 285/238, 355, 347, 351, 285/332.2, 915, 40

[56] References Cited

U.S. PATENT DOCUMENTS

| | | | |
|---|---|---|---|
| 2,453,997 | 11/1948 | MacWilliam | 285/347 X |
| 2,907,589 | 10/1959 | Knox | 285/355 |
| 3,001,804 | 9/1961 | Tomlinson et al. | 285/347 X |
| 3,784,235 | 1/1974 | Kessler et al. | 285/915 X |
| 4,258,742 | 3/1981 | Louthan et al. | 285/355 X |
| 4,582,349 | 4/1986 | Chenoweth et al. | 285/355 X |

FOREIGN PATENT DOCUMENTS

| | | |
|---|---|---|
| 1223208 | 8/1966 | Fed. Rep. of Germany . |
| 3315030 | 10/1984 | Fed. Rep. of Germany . |
| 3323379 | 1/1985 | Fed. Rep. of Germany ...... 285/238 |
| 2452657 | 10/1980 | France . |
| 2133850 | 8/1984 | United Kingdom . |

Primary Examiner—Thomas F. Callaghan
Attorney, Agent, or Firm—Schwartz, Jeffery, Schwaab, Mack, Blumenthal & Evans

[57] ABSTRACT

A connecting arrangement comprising a threaded sleeve of synthetic plastic material and a tube portion having a pipe thread. The threaded sleeve contains an insert nut with an internal thread and a synthetic plastic ring which is engaged by the pipe thread of the tube portion. The tube portion has at its forward end a supplemental sealing ring which sealingly engages a sealing region of the synthetic plastic ring. The sealing region is spaced from the axial ends of the threaded sleeve and has an inner diameter which is smaller than the outer diameter of the sealing ring. A further seal may be provided by disposing an adhesive sealing mass in an annular groove on the tube portion such that the mass adheres the tube portion to the sleeve when they are connected.

25 Claims, 6 Drawing Figures

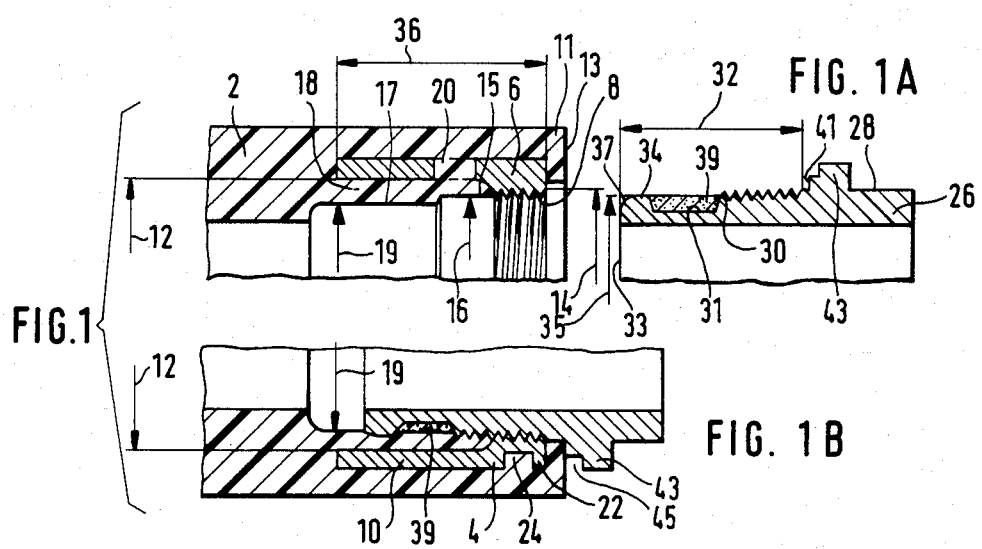
FIG. 1A
FIG. 1B
FIG. 1
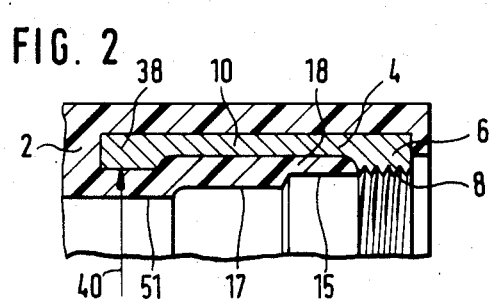
FIG. 2
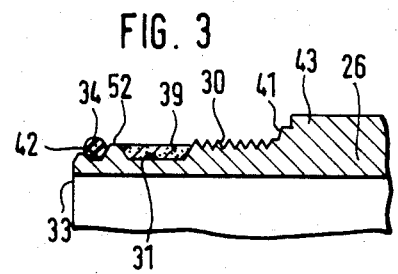
FIG. 3
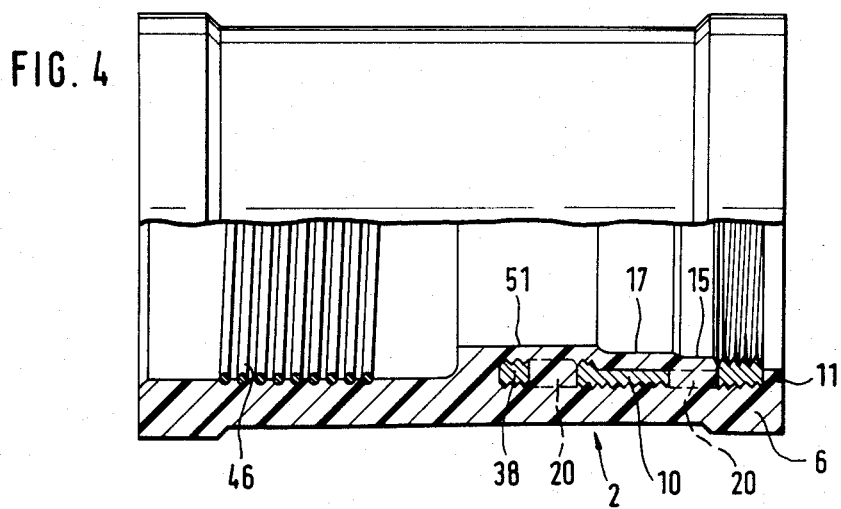
FIG. 4

CONNECTING ARRANGEMENT WITH A THREADED SLEEVE

BACKGROUND OF THE INVENTION

This invention relates to a connecting arrangement with a threaded sleeve or coupling of synthetic plastic material, preferably of a polyolefin such as for example polyethylene, and with a tube portion having a pipe thread, particularly a metal pipe or metal fitting, in which the threaded coupling comprises an injection molded insert nut member with internal threads and an inner synthetic plastic ring engaged by the pipe thread of the tube portion.

German Published Application DE-OS No. 33 15 030 discloses a threaded coupling of synthetic plastic material for connection to a metal pipe or metal fitting having a pipe thread. In order to connect the metal pipe to the threaded coupling with a tight seal and still have the parts releasable from each other, this arrangement comprises a metal insert nut which is provided in its forward region with an internal thread extending through a prescribed length. Adjoining the internal thread is a jacket having an internal diameter greater than the outer diameter of the internal thread. The interior of the jacket is filled with a synthetic plastic ring of the threaded coupling. When the metal pipe or metal fitting is screwed into the coupling, its pipe threads cut into or are pressed into the synthetic plastic ring. In installations which must meet high safety requirements, particularly in gas lines, or also in installations subjected to high pressures, the degree of seal in this known connecting arrangement may not be sufficiently great. Thus, particularly in view of applications requiring long service lives of many years or decades, difficulties may arise with the respect to the functional reliability. German Patent DE-PS No. 12 23 208 discloses a pipe connection for synthetic plastic pipes in which both pipe ends have an external thread and are coupled to each other with a threaded connector. The threaded connector contains at one end at least one nose extending parallel to the axis and having a contact surface or stop. One pipe end has a radial nose associated with the contact surface. This ensures that the threaded connector is not screwed too far, but also not to little, onto the one pipe end. A transition from a metal pipe to a synthetic plastic pipe is not necessarily readily achievable with this arrangement, and no really high demands can be made on the tightness of the seal.

French Patent Application FR No. 2 452 657 discloses an arrangement in which a synthetic plastic pipe is connected with a metal nut. A connecting piece is introduced into the end of the synthetic plastic pipe which is anchored in an undercut in the interior of the nut. The exterior surface of the connecting piece is provided with teeth and grooves. The end of the pipe and the connecting piece are surrounded by an injection molded piece which is injection molded around these two parts after the intermediate piece is introduced into the end of the pipe. Suitable tools and machinery are required to produce this injection molded piece, i.e. for molding around the end of the synthetic plastic pipe. Sealing of the connecting piece with respect to the threaded nut is achieved by screwing the threaded nut onto a threaded support which requires further sealing elements.

British patent application GB No. 21 33 850 discloses a connecting arrangement in which a first part is slid into a synthetic plastic pipe. This first part is provided on its outer surface with a radial rib, and the synthetic plastic pipe is pressed onto this rib by means of a threaded nut surrounding the outside of the pipe. The radial rib has small ribs or teeth on its outer surface which are pressed into the inner surface of the synthetic plastic pipe. Sealing takes place only in the vicinity of the aforementioned rib, and a supplemental securing means or seal is not provided.

SUMMARY OF THE INVENTION

It is the object of the invention to provide an improved connecting arrangement with a threaded sleeve and a tube portion.

Another object of the invention is to provide a connecting arrangement with a threaded sleeve and a tube portion which is inexpensive to produce.

A further object of the invention is to provide a connecting arrangement with a threaded sleeve and a tube portion which achieves a better seal.

It is also an object of the present invention to provide a connecting arrangement between a threaded sleeve and a tube portion which is simple to install and enables convenient production of the connection.

Additionally it is an object of the present invention to provide a connecting arrangement between a threaded sleeve and a tube portion which ensures a significantly better sealing effect and can be utilized at high pressures.

Yet another object of the invention is to provide a connecting arrangement between a threaded sleeve and a tube portion which can be assembled using conventional tools.

A still further object of the present invention is to provide a connecting arrangement between a threaded sleeve and a tube portion which can utilize known insert nuts without significant changes.

In view of the safety requirements to be observed in installation of gas lines, it is an object of the invention to provide a connecting arrangement between a threaded sleeve and a tube portion in which subsequent release of the connection cannot take place.

An additional object of the invention is to provide a connecting arrangement between a threaded sleeve and a tube portion which exhibits a high resistance to corrosion.

Another object of the invention is to provide a connecting arrangement between a threaded sleeve and a tube portion which exhibits a high degree of functional reliability.

These and other objects of the invention are achieved by providing a connecting arrangement for a threaded sleeve and a tube portion wherein the tube portion has a sealing ring on its forward end and wherein the threaded sleeve has a synthetic plastic ring with a supplemental sealing region spaced from an end face of the synthetic plastic ring which supplemental sealing region cooperates with the sealing ring of the tube portion, the inner diameter of the supplemental sealing region being smaller than the outer diameter of the sealing ring.

The connecting arrangement of the invention ensures with a comparatively simple construction an extremely tight and functionally secure connection between the threaded sleeve and a metal tube portion. Because of the sealing ring which is pressed into synthetic plastic ring of the threaded sleeve, a seal against the internal pressure, particularly gas pressure, prevailing in the tube portion is created in an extremely reliable fashion. Thus, in addition to the one seal which is achieved by means of the pipe thread which engages the synthetic plastic ring, a supplemental seal against the internal pressure is created by means of the sealing ring. The region of the synthetic plastic ring which engages the aforesaid sealing ring has a reduced diameter in comparison to the internally threaded region, and the synthetic plastic ring which is formed in steps in this way can be produced without difficulty. The metal insert nut of the above-mentioned known threaded sleeve can be retained without change, and only small changes are required in the tools for producing the threaded sleeve. Due to the two-fold seal, a high degree of safety is ensured.

It is also within the scope of the invention to form the insert nut of a non-metallic material, particularly a glass fiber reinforced material. The supplemental sealing ring is advantageously completely engaged in the associated sealing region of the synthetic plastic ring, whereby the length of the sealing region is greater than the axial length of the sealing ring. When the connection is made, the sealing ring is pushed axially along a portion of the inner surface of the sealing region and thereby displaces the elastic synthetic plastic material. The sealing ring engages the sealing region in a press fit. Alternatively the sealing ring can also be brought into only quasi contact with the sealing region. In all embodiments of the invention the sealing ring of the invention consists of a relative stiff or rigid material in comparison to the elastic synthetic plastic material. The sealing ring is thus pressed at least part way into the relatively soft synthetic plastic whereby a tight and functionally secure transition from the metallic tube portion to the sleeve of plastic material is achieved. The synthetic plastic sleeve can be a part of a synthetic plastic pipe, or it may be connected in a suitable manner to such a synthetic plastic pipe.

In one particular embodiment, the sealing ring is an integral part of the tube portion. The sealing ring in this embodiment is formed as a sealing hump or bulge which is arranged at the forward end of the tube portion. The expense of producing this type of integrally formed sealing hump or sealing ring is small.

In another embodiment, the sealing ring is arranged as a separate component at the forward end of the tube portion, particularly in an annular groove. The sealing ring can be formed as a conventional U-ring which is inserted in the annular groove at the forward end of the tube portion.

In one particular embodiment the inner surface of the sealing region associated with (disposed opposite) the sealing ring or sealing hump is formed cylindrical and/or smooth, whereby optionally provided perforations of the insert nut are arranged axially spaced from this sealing region. Due to the cylindrical, smooth inner surface of the sealing region, an extremely reliable seal is assured in conjunction with the sealing hump which is also annular. The cylindrical inner surface and the sealing ring lie substantially coaxial to each other after assembly of the connecting arrangement, chiefly because perfect centering and coaxial alignment are dictated by the threaded connection between the insert nut and the tube portion. Insofar as the insert nut is provided with radial perforations, these perforations lie outside of the sealing region. On the one hand an exact cylindrical inner surface is thereby assured in production without special finish work, and on the other hand a weakening of the elastic synthetic plastic material in the sealing region is prevented which could occur if radial perforations were present in the sealing region.

In one significant embodiment the tube portion is provided with an annular groove axially between the sealing ring and the pipe thread for receiving an elastic sealing mass. This sealing mass ensures a further seal so that a total of three different seals which work independently of each other against the internal pressure are present. The production cost and also the assembly cost are extremely small, however. By means of the elastic sealing mass a connection can additionally be achieved between the threaded sleeve and the tube portion which subsequently cannot be released. According to the invention, the sealing mass has adhesive properties and adheres firmly both to the tube portion and also to the threaded sleeve. A connection of this type is reliably protected in optimum manner against subsequent unscrewing and loss of seal tightness in the other seal regions. During assembly of the connection, the sealing mass is forced into the threads, whereby the thread surfaces of the tube portion and the insert nut are adhered to each other. Thus, an improvement of the sealing effect in the threaded region is achieved in accordance with the invention. As sealing masses or adhesives within the scope of the invention, cyanoacrylates or comparable masses are contemplated. The sealing mass or adhesive according to the invention reacts with the metal, and a polymerization layer is formed. Introduction of the adhesive can be carried out in a simple manner during the assembly because of the arrangement of the annular groove between the pipe thread and the sealing hump or forward end of the tube portion.

When the connecting arrangement is screwed together, there is an annular gap or annular chamber between the tube portion and the synthetic plastic ring or sealing region. In accordance with the invention this remaining annular gap exhibits a radial height of at most 1 mm, advantageously up to 0.8 mm, and in most cases about 0.4 mm. The depth of the annular groove, i.e. half the difference in diameter between the sealing hump and the bottom surface of the annular groove is as a rule larger than the aforementioned remaining gap height. This is because of the elastically resilient character of the synthetic plastic ring. In producing the connection a portion of the sealing mass is thus pressed out of the annular groove and also reaches into the threaded connection between the forward, first region of the synthetic plastic ring and the threads and produces there an extremely reliable supplemental seal or adhesive bond. Further, by appropriate choice of dimensions and selection of the amount of the elastic sealing mass, it can additionally be assured that the thread of the insert nut is also adhesively bonded with the thread of the tube portion. The most significant thing, however, is the reaction or polymerization at the metal of the insert nut in the region in which the threads of the insert nut engage the synthetic plastic ring. The gap between the bottom surface of the annular groove and the inner surface of the synthetic plastic ring is predetermined in accordance with the requirements and characteristics of the elastic sealing mass.

In order to obtain a reliable seal against externally acting media, the threaded sleeve as well as the tube portion are provided with end faces which lie adjacent each other and advantageously are pressed against each when the joint is screwed together. A total of four different sealing regions are provided.

BRIEF DESCRIPTION OF THE DRAWINGS

The invention will be explained in further detail hereinafter with reference to the embodiments illustrated in the accompanying drawings.

FIG. 1 shows an axial section of a connecting arrangement according to the invention whereby in FIG. 1A the tube portion is not yet screwed into the threaded sleeve, and in FIG. 1B tube portion is already screwed ipto the threaded sleeve.

FIG. 2 shows a section through a threaded sleeve having an insert nut with a cylindrical end portion.

FIG. 3 shows an alternate embodiment of the tube portion with a separate sealing ring.

FIG. 4 is an elevational view, partially in section, of a double sleeve provided at one end with a spiral heat element and at the other end with an insert nut.

DETAILED DESCRIPTION OF PREFERRED EMBODIMENTS

FIG. 1 shows a threaded sleeve 2 of synthetic plastic material in which an insert nut 4 of metal is embedded. Injection nut 4 comprises a forward region 6 with an internal thread 8. Injection nut 4 is completely surrounded by synthetic plastic except for internal thread 8, whereby the synthetic plastic sleeve 2 comprises a retaining band 11 at its forward end. Suitable plastic materials include polyolefins, such as, for example, polyethylene. A jacket portion or mantle 10 is joined to the forward region 6 of insert nut 4. The inner diameter 12 of mantle 10 is larger than the outer diameter of the internal thread 8. Disposed within mantle 10 is a synthetic plastic ring 18 which is an integral part of threaded sleeve 2 and is formed during injection molding of sleeve 2 around insert nut 4. Plastic ring 18 comprises a first region 15 having an internal diameter 16 and a second region 17 having an inner diameter 19. Because of the stepped configuration or arrangement of the two axially adjacent regions 15 and 17, a good seal is assured in connection with the tube portion 26, shown here formed as a metal fitting, even at high internal pressures. The inner diameter 16 of first region 15 is smaller than the outer diameter 14 of the internal thread. According to the invention, this inner diameter 16 lies between the flank diameter and the thread base diameter of the internal thread. Insert nut 4 further comprises radial perforations 20 which likewise are filled with synthetic plastic. These radial perforations 20 serve on the one hand to fix the insert nut against undesired twisting or axial displacement and on the other hand to assure uniform distribution of the synthetic plastic material during injection molding of the plastic so that the synthetic plastic ring 18 is formed completely without any breaks. A rib 22 or a recess 24 is further provided on the outer surface of the insert nut for the purpose of fixing its position. Perforations 20, rib 22 and recess 24 are provided in any given case according to the construction requirements.

In FIG. 1A a tube portion 26 is illustrated before assembly, i.e. before it is screwed into the threaded sleeve. Tube portion 26 may comprise the end of a metal pipe or a metal fitting or a metal armature of a valve, etc. Tube portion 26 is provided on its outer surface 28 with a pipe thread 30, which is shown here as a barrel or tapered thread. It is also within the scope of the invention to use a cylindrical thread. Pipe thread 30 has a length 32. Insert nut 4, i.e. mantle 10 together with forward region 6, has a total length 36 which is greater than the length 32 of tube portion 26 measured from the beginning of pipe thread 30 to the end of the tube. Tube portion 26 further comprises an annular groove 31 axially adjacent the pipe thread 30, which groove extends up to a sealing ring 34 at forward end 33. The outer diameter 35 of sealing ring 34 is smaller than the tooth peak diameter of internal thread 8 and/or smaller than the inner diameter 16 of first region 15. In accordance with the invention, on the other hand, the outer diameter 35 may be larger than the inner diameter 19 of the second sealing region 17 of synthetic plastic ring 18. In this embodiment the sealing ring 34 is an integral part of tube portion 26 and together with the tube portion comprises a single member. The production cost of the sealing ring or sealing hump is small. In order to facilitate insertion of the tube portion, the sealing ring or hump 34 is provided at its forward end with a beveled nose or chamfer 37. The angle of inclination between the chamfer 37 and the longitudinal axis of tube portion 26 advantageously lies in the range from 20° to 40°, and is preferably about 30° in size. An elastic sealing mass 39 is introduced into the annular groove 31 before the connection is assembled. Threaded sleeve 2 has an axial end face 13 on band portion 11 which is associated with a further axial end face 41 on tube portion 26. When the tube portion is screwed into the threaded sleeve, end faces 13 and 41 lie tightly against each other and are pressed together. Due to the pressing of the two end faces 13 and 41 against each other, a seal is created against the influence of external media.

In FIG. 1B the connecting arrangement is illustrated with the tube portion 26 and the threaded sleeve 2 screwed together. Sealing ring 34 is pressed in accordance with the invention into the synthetic plastic ring 18, and indeed into the second region 17 with the reduced inner diameter 19. A first seal is thereby created. The elastic sealing mass 39 disposed in the annular groove produces a second seal and adheres the tube portion 26 to the threaded sleeve 2. A third seal is produced by the pipe thread 30 engaging and/or cutting into the synthetic plastic ring 18. Within the scope of the invention, the effectiveness of this third seal may be substantially improved by the sealing or adhesive mass which is forced out of the annular groove when the parts are screwed together and passes to the threads. In the assembled state the spacing between the bottom surface 31 and the smooth, cylindrical inner surface of sealing region 17 amounts to at most 1 mm, preferably 0.6 mm and usually 0.4 mm. The three aforedescribed seals lie successively one after the other with respect to the internal pressure, and any "creeping out", particularly of a gaseous medium, from the interior to the outside is prevented with an extremely high degree of reliability.

The adjacently positioned end faces 13 and 41 of threaded sleeve 2 and tube portion 26 constitute a fourth seal, which provides a sealing effect against penetration of a medium from the outside in. Tube portion 26 comprises a ring 43 in the vicinity of end face 41 which is hexagonally formed like a hexagonal nut and which can be gripped by a conventional wrench to screw the tube portion 26 into threaded sleeve 2. Instead of a hexagonal ring, other means could also be provided to enable tools to be used to screw the tube portion into the threaded sleeve. Between the band 11 and the ring 43 there is still a gap 45 when the tube portion is screwed into the threaded sleeve. This annular gap 45 serves as a visible control for checking the depth to which the tube portion is screwed into the threaded sleeve. Within the scope of the invention, ring 43 may also be formed in such a way that gap 45 completely disappears when the tube portion 26 is screwed into threaded sleeve 2 and the axial end face 13 of the threaded sleeve contacts ring 43.

The threaded sleeve may further be provided on its other end (the left end as viewed in FIG. 1) with a spiral heating coil (not shown in FIG. 1, but illustrated in FIG. 4) to enable a synthetic plastic tube of heat weldable material to be welded on in a well known manner.

Tube portion 26 may, within the scope of the invention, also be provided at its other end 49 with a suitable connector for a metal pipe or the like. Further, tube portion 26 may, within the scope of the invention, comprise a part of an armature, a valve or the like. An external thread, an internal thread, a ball connector, or also a bayonet connector may be mentioned here in particular. In all embodiments a four-fold seal between the tube portion and the threaded sleeve is produced due to the arrangement of the invention.

FIG. 2 shows an embodiment in which the insert nut 4 is additionally provided with a cylindrical end piece 38. The synthetic plastic ring 18 is disposed axially between end piece 38 and forward region 6. The cylindrical end piece has an inner diameter 40 which corresponds approximately to the core diameter of internal thread 8. When the hump is pressed into the sealing region, the cylindrical end piece reliably prevents positional deviations of the synthetic plastic, whereby a particularly high degree of functional reliability is assured. In accordance with the invention the hump may lie in second region 17 when the tube portion is screwed into the threaded sleeve. Threaded sleeve 2 comprises a further region 51, the inner diameter of which is even smaller than that of second region 17. Threaded sleeve 2, i.e. the synthetic plastic ring, thus comprises a total of three stepped regions with differing inner diameters.

FIG. 3 shows an embodiment in which a separate sealing ring 34 is arranged at the forward end 33 of tube portion 26. Sealing ring 34 may be formed as an O-ring. Between the sealing ring 34 and the aforedescribed annular groove 31 there is an annular shoulder 52 against which the sealing ring 34 is supported. Within the scope of the invention, the sealing ring may optionally be arranged in an annular groove 42 at the forward end 33 of tube portion 26 in order to prevent unintentional separation before the parts are screwed together. Tube portion 26 is a component part of a valve, a drilled armature, or the like, not illustrated in further detail, which is contemplated to be connected at the right margin of the drawing in a manner not described here in further detail.

FIG. 4 illustrates a double sleeve comprising a threaded sleeve according to the invention. At the left of the drawing a spiral heating coil 46 can be seen to enable a synthetic plastic pipe to be connected here by heat coil welding. With a double sleeve of this type constructed according to the invention, a synthetic plastic pipe can reliably be connected with a metal pipe even when high requirements are placed on the tightness of the seal. The three stepped regions which are associated with the mantle 10 and the cylindrical end piece 38 can be seen clearly. The retaining band 11 of the threaded sleeve 2 forwardly surrounds the insert nut, the internal thread of which is visible and freely accessible. The insert nut is otherwise completely embedded in the synthetic plastic material of the threaded sleeve, whereby the radial perforations 20 are also filled with plastic material to anchor the insert nut.

The foregoing description has been set forth merely to illustrate the invention and is not intended to be limiting. Since modifications of the described embodiments incorporating the spirit and substance of the invention may occur to persons skilled in the art, the scope of the invention should be limited solely with respect to the scope of the appended claims and equivalents.

I claim:

1. A connecting arrangement between a threaded sleeve of synthetic plastic material and a tube portion having a pipe thread thereon, wherein said threaded sleeve comprises an insert nut with an internal thread and an inner synthetic plastic ring which is engaged by the pipe thread of said tube portion, wherein said tube portion comprises a supplemental sealing ring, and wherein said synthetic plastic ring comprises a first sealing region within said insert nut spaced from an axial end face of said plastic ring and having an inner diameter smaller than the outer diameter of said pipe thread on said tube portion, and a second sealing region within said insert nut axially adjoining said first sealing region through a radial step and having an inner diameter smaller than the inner diameter of said first sealing region and smaller than the outer diameter of said sealing ring, said pipe thread of said tube portion sealingly engaging said first sealing region, and said sealing ring of said tube portion sealingly engaging said second sealing region of said synthetic plastic ring when said tube portion is connected to said threaded sleeve.

2. A connecting arrangement according to claim 1, wherein said threaded sleeve is formed of polyolefin material.

3. A connecting arrangement according to claim 2, wherein said threaded sleeve is formed of polyethylene.

4. A connecting arrangement according to claim 1, wherein said tube portion is formed of metal.

5. A connecting arrangement according to claim 4, wherein said sealing ring is formed at the end of said tube portion.

6. A connecting arrangement according to claim 1, wherein said sealing ring is formed as an integral hump on said tube portion.

7. A connecting arrangement according to claim 1, wherein said sealing ring comprises a separate member mounted at the end of said tube portion.

8. A connecting arrangement according to claim 7, wherein said sealing ring is mounted in an annular groove at the end of said tube portion.

9. A connecting arrangement according to claim 1, wherein said first and second sealing regions of said synthetic plastic ring each have a smooth, cylindrical radially inward surface.

10. A connecting arrangement according to claim 1, wherein said insert nut is provided with radial perforations axially spaced from said sealing regions.

11. A connecting arrangement according to claim 1, wherein said sealing ring of said tube portion is disposed within said insert nut of said threaded sleeve when said pipe thread of said tube portion is screwed into said threaded sleeve.

12. A connecting arrangement according to claim 1, wherein said threaded sleeve comprises an axial end face which sealingly contacts an axial face on said tube portion when said pipe thread of said tube portion is screwed into said threaded sleeve.

13. A connecting arrangement according to claim 1, wherein said insert nut further comprises a mantle portion surrounding synthetic plastic ring of said threaded sleeve and an end portion having an inner diameter smaller than the inner diameter of said mantle portion, and wherein said sealing region of said synthetic plastic ring is positioned between said internal thread on said insert nut and said end portion of said insert nut.

14. A connecting arrangement according to claim 1, wherein the length of the pipe thread on said tube portion is substantially shorter than the axial length of said insert nut.

15. A connecting arrangement according to claim 1, wherein the axial length of said pipe thread on said tube portion is not longer than the sum of the axial lengths of the internal thread on said insert nut and the first sealing region on said synthetic plastic ring.

16. A connecting arrangement according to claim 1, wherein the end of said tube portion is positioned within the insert nut when said pipe thread of said tube portion is screwed into said threaded sleeve.

17. A connecting arrangement according to claim 1, wherein the outer diameter of said sealing ring is at most equal to the inner diameter of the thread peaks of the internal thread of said insert nut.

18. A connecting arrangement according to claim 1, wherein said tube portion further comprises an annular groove for receiving an elastic sealing mass, and said sealing ring and said annular groove together have an axial length which is substantially equal to the axial length of said second sealing region.

19. A connecting arrangement between a threaded sleeve of synthetic plastic material and a tube portion having a pipe thread thereon, wherein said threaded sleeve comprises an insert nut with an internal thread and an inner synthetic plastic ring which is engaged by the pipe thread of said tube portion, wherein said tube portion comprises a supplemental sealing ring, wherein said synthetic plastic ring comprises a sealing region spaced from an axial end face of said plastic ring and having an inner diameter smaller than the outer diameter of said sealing ring, said sealing ring of said tube portion sealingly engaging said sealing region of said synthetic plastic ring when said tube portion is connected to said threaded sleeve, and wherein said tube portion further comprises an annular groove disposed between said sealing ring and said pipe thread and containing an elastic adhesive sealing mass, said adhesive mass tightly adhering said tube portion to said threaded sleeve when said tube portion is screwed into said threaded sleeve.

20. A connecting arrangement according to claim 19, wherein between a bottom surface of said annular groove and a radially inner surface of said synthetic plastic ring there is an annular gap filled with said elastic sealing mass.

21. A connecting arrangement according to claim 20, wherein said radially inner surface of said synthetic plastic ring is in said sealing region.

22. A connecting arrangement according to claim 20, wherein said annular gap has a maximum radial height of 1 mm.

23. A connecting arrangement according to claim 22, wherein said annular gap has a radial height of at most 0.6 mm.

24. A connecting arrangement according to claim 23, wherein said annular gap has a radial height of about 0.4 mm.

25. A connecting arrangement according to claim 19, wherein said annular groove is disposed immediately adjacent one end of the pipe thread on said tube portion, between the end of the tube portion and the pipe thread, and immediately adjacent the other end of the pipe thread there is an annular ring having a diameter greater than the diameter of the pipe thread, said annular ring having an axial surface facing toward the pipe thread which sealingly contacts an axial end surface of said threaded sleeve when said tube portion is screwed into said threaded sleeve.

* * * * *